United States Patent Office

Re. 25,187

Reissued June 19, 1962

25,187

ELECTRIC CABLES AND CONDENSER INSULATION INCLUDING WAX AND PETROLATUM

Geoffrey Ernest Bennett, Crayford, England, assignor to Dussek Brothers & Company Limited, Crayford, England, a British company No Drawing. Original No. 2,867,596, dated Jan. 6, 1959, Ser. No. 445,937, July 26, 1954. Application for reissue Nov. 23, 1959, Ser. No. 854,986
Claims priority, application Great Britain Aug. 13, 1953
15 Claims. (Cl. 260—27)

Matter enclosed in heavy brackets [ ] appears in the original patent but forms no part of this reissue specification; matter printed in italics indicates the additions made by reissue.

The invention is for improvements in or relating to electric cables and condensers and has particular reference to impregnating compositions for use in the manufacture of cables and condensers in which the dielectric consists of fibrous material, for example paper tape, impregnated with an insulating composition.

It is an object of the present invention to provide a cable or condenser impregnating composition having good non-migratory properties and which may, accordingly, be used in any situation where compound migration of the impregnant could cause trouble.

*I* [We] have now found that petrolatum may be used as the basis of the impregnating composition in the place of the insulating oil.

According to the present invention there is provided a composition for the impregnation of fibrous material for the insulation of the conductors of cables or condensers which composition comprises petrolatum containing from 3% to 50% by weight on the weight of the final composition of a synthetic hydrocarbon wax of melting point above 85° C. and of low dielectric loss, with [or without] polyisobutylene and/or polyethylene. The synthetic hydrocarbon wax preferably has a melting point between 85° and 120° C., and is preferably employed in a proportion of from 10% to 30% by weight on the weight of the final composition.

An example of a suitable synthetic *Fischer Tropsch hydrocarbon* wax is that known under the trade name "Super Hard Wax No. 105," which wax has a melting point of 108°/110° C. [and is a product of the Fischer Tropsch process]. This wax has an average molecular weight of about 600 corresponding to $C_{40}$ and its boiling point under vacuum is above 460° C. [A further example of a suitable synthetic wax is a synthetic wax produced by the hydrogenation of less saturated naturally occurring hydrocarbons. A still further example of a suitable synthetic wax is a polyethylene wax known under the trade name "Alcowax."]

The proportion of polyisobutylene and/or polyethylene in the impregnating composition, when employed, will depend upon the molecular weight of the polymer. Thus when low molecular weight polyisobutylene and/or polyethylene are used, e.g. polyisobutylene of approximate molecular weight 1200 known as Oronite 32, or Polythene Grade 200,000 of approximate molecular weight 2500, a proportion of up to 40% of the polymeric material by weight on the weight of the final composition may be used. When high molecular weight polyisobutylene and/or polyethylene are employed, e.g. polyisobutylene of approximate molecular weight 100,000 the proportion of the polymeric material should not, in general, exceed 10% by weight on the weight of the final composition.

There may be included in the composition a proportion of up to 40% by weight on the weight of the final composition of petroleum wax, rosin or other resins of low dielectric loss. Oxidation inhibitors, for example, phenyl β naphthylamine, and metal deactivators, for example, NN′ disalicylidene ethylenediamine, may also be incorporated in the impregnating composition in proportions of up to 0.2% oxidation inhibitor and 0.02% metal deactivator by weight on the weight of the final composition, to prevent oxidation or deterioration of the composition both during manufacture and in the finished cable or condenser.

The invention includes a process for the manufacture of a composition for cable and condenser impregnation as above described, which process comprises dissolving polyisobutylene and/or polyethylene in a synthetic hydrocarbon wax preferably in an inert atmosphere with agitation at an elevated temperature and thereafter adding petrolatum to the mixture. Alternatively using the method of manufacture given in British patent specification No. 650,088 the polyisobutylene may be dissolved in a solvent and a mixture of petrolatum and synthetic hydrocarbon wax added thereto, the solvent then being removed.

The invention also includes cables and condensers th fibrous insulating layers whereof are impregnated with composition as above described.

The following is a description by way of example impregnating compositions made in accordance with th present invention.

[Example I]

[15% by weight "Super Hard Wax No. 105."
85% by weight yellow petroleum jelly B. P. (Melti point 125° F.)

The composition had a Ubbelohde drop point of 76° C

Example[II] *I*

15% by weight "Super Hard Wax No. 105."
42.5% by weight yellow petroleum jelly B. P. (Melti point 125° F.)
42.5% by weight polyisobutylene. Molecular weight proximately 1,200.

The composition had a Ubbelohde drop point of 85°

[Example III]

[25% by weight "Super Hard Wax No. 105."
75% by weight green petroleum jelly. (Melting p 135° F.)

The composition had a Ubbelohde drop point of 94°

Example[IV] *II*

15% by weight "Super Hard Wax No. 105."
5% by weight polyethylene grade 200.
80% by weight yellow petroleum jelly B. P. (Mel point 125° F.)

The composition had a Ubbelohde drop point of 73

Example[V] *III*

10% by weight "Super Hard Wax No. 105."
5% by weight micro-crystalline wax. (Melting 185° F.)
85% by weight yellow petroleum jelly B. P. (Me point 125° F.)

The composition had a Ubbelohde drop point of 6

I claim:

[1. A composition for the impregnation of fibrous terial for the insulation of the conductors of cables v composition consists of petrolatum containing fro percent to 50 percent by weight of a synthetic Fi Tropsch hydrocarbon wax having a molecular weig about 600, a melting point between 108° and 110 a boiling point under atmospheric pressure of 460° C., and low dielectric loss, together with from 1 ent to 40 percent by weight of at least one compound elected from the group consisting of polyisobutylene aving a molecular weight of approximately 100,000 and olyethylene having a molecular weight of approximately 500.]

[2. A composition as set forth in claim 1, and includ- g from 1 percent to 40 percent by weight of rosin.]

[3. A composition as set forth in claim 1, and includ- g up to 0.02 percent by weight of NN′ disalicylidene hylenediamine.]

[4. A process for the manufacture of a composition r cable impregnation which process consists in dissolv- g from 1 percent to 40 percent by weight of at least e compound selected from the group consisting of poly- butylene having a molecular weight of approximately 0,000 and polyethylene having a molecular weight of proximately 2,500, in from 3 percent to 50 percent weight of a synthetic Fischer Tropsch hydrocarbon x having a molecular weight of approximately 600, nelting point between 108° and 110° C., and low di- ctric loss in an inert atmosphere with agitation at a nperature from 110° to 140° C., and thereafter add- petrolatum to the mixture.]

5. A composition as set forth in claim 1, and including to 0.2 percent by weight of an oxidation inhibitor.]

. *A composition for the impregnation of fibrous ma- al for the insulation of the conductors of cables which nposition consists of solid petrolatum containing from ercent to 50 percent by weight of a synthetic Fischer psch hydrocarbon wax having a melting point be- en 85° and 120° C., a boiling point under atmos- ric pressure of above 460° C., and low dielectric loss, ther with from 1 percent to 40 percent by weight t least one compound selected from the group con- ng of polyisobutylene having a molecular weight of oximately 1200 to 100,000 and polyethylene having olecular weight of at least approximately 2,500.*

*A composition as set forth in claim 6, and includ- rom 1 percent to 40 percent by weight of rosin.*

*A composition as set forth in claim 6, and includ- up to 0.02 percent by weight of NN′ disalicylidene enediamine.*

*A composition as set forth in claim 6, and includ- p to 0.2 percent by weight of an oxidation inhibitor.*

*A process for the manufacture of a composition able impregnation which process consists in dissolv- rom 1 percent to 40 percent by weight of at least compound selected from the group consisting of obutylene having a molecular weight of approxi- y 1200 to 100,000 and polyethylene having a ular weight of at least approximately 2.500, in 3 percent to 50 percent by weight of a synthetic r Tropsch hydrocarbon wax having a melting point en 85° and 120° C., and low dielectric loss in an atmosphere with agitation at a temperature from to 140° C., and thereafter adding solid petrolatum mixture.*

*A composition for the impregnation of fibrous ma- or the insulation of the conductors of cables which sition consists of petrolatum containing from 3 t to 50 percent by weight of a synthetic Fischer h hydrocarbon wax having a molecular weight of 600, a melting point between 108° and 110° C., ng point under atmospheric pressure of above ., and low dielectric loss, together with from 1 to 40 percent by weight of at least one com- selected from the group consisting of polyisobutyl- ing a molecular weight of approximately 1200 to and polyethylene having a molecular weight of approximately 2,500.*

*12. A composition as set forth in claim 11, and including from 1 percent to 40 percent by weight of rosin.*

*13. A composition as set forth in claim 11, and including up to 0.02 percent by weight of NN′ disalicylidene ethylenediamine.*

*14. A composition as set forth in claim 11, and including up to 0.2 percent by weight of an oxidation inhibitor.*

*15. A process for the manufacture of a composition for cable impregnation which process consists in dissolving from 1 percent to 40 percent by weight of at least one compound selected from the group consisting of polyisobutylene having a molecular weight of approximately 1200 to 100,000 and polyethylene having a molecular weight of at least approximately 2,500, in from 3 percent to 50 percent by weight of a synthetic Fischer Tropsch hydrocarbon wax having a molecular weight of approximately 600, a melting point between 108° and 110° C., and low dielectric loss in an inert atmosphere with agitation at a temperature from 110° to 140° C., and thereafter adding petrolatum to the mixture.*

*16. A composition for the impregnation of fibrous material for the insulation of the conductors of cables which composition consists of solid petrolatum containing from 3 percent to 50 percent by weight of a synthetic Fischer Tropsch hydrocarbon wax having a melting point between 85° and 110° C., a boiling point under atmospheric pressure of above 460° C., and low dielectric loss, together with from 1 percent to 40 percent by weight of at least one compound selected from the group consisting of polyisobutylene having a molecular weight of approximately 1200 to 100,000 and polyethylene having a molecular weight of at least approximately 2,500.*

*17. A composition as set forth in claim 16, and including from 1 percent to 40 percent by weight of rosin.*

*18. A composition as set forth in claim 16, and including up to 0.02 percent by weight of NN′ disalicylidene ethylenediamine.*

*19. A composition as set forth in claim 16, and including up to 0.2 percent by weight of an oxidation inhibitor.*

*20. A process for the manufacture of a composition for cable impregnation which process consists in dissolving from 1 percent to 40 percent by weight of at least one compound selected from the group consisting of polyisobutylene having a molecular weight of approximately 1200 to 100,000 and polyethylene having a molecular weight of at least approximately 2,500, in from 3 percent to 50 percent by weight of a synthetic Fischer Tropsch hydrocarbon wax having a melting point between 85° and 110° C., and low dielectric loss in an inert atmosphere with agitation at a temperature from 110° to 140° C., and thereafter adding solid petrolatum to the mixture.*

References Cited in the file of this patent or the original patent

UNITED STATES PATENTS

| | | |
|---|---|---|
| 1,594,829 | Gray | Aug. 3, 1926 |
| 1,706,333 | Toch | Mar. 19, 1929 |
| 2,499,756 | Jacobson | Mar. 7, 1950 |
| 2,551,087 | Barnhart et al. | May 1, 1951 |
| 2,586,345 | King | Feb. 19, 1952 |
| 2,594,547 | Fischer | Apr. 29, 1952 |
| 2,618,803 | Parmet | Nov. 25, 1952 |
| 2,857,350 | Thompson et al. | Oct. 21, 1958 |